United States Patent [19]
O'Leary et al.

[11] Patent Number: 5,289,847
[45] Date of Patent: Mar. 1, 1994

[54] PLATE-TYPE VALVE FOR A PRESSURED-FLUID MACHINE, AND A VALVING PLATE ASSEMBLY THEREFOR

[75] Inventors: Thomas D. O'Leary; Terry J. Ott, both of Painted Post, N.Y.

[73] Assignee: Dresser-Rand Company, Corning, N.Y.

[21] Appl. No.: 980,031

[22] Filed: Nov. 23, 1992

[51] Int. Cl.$^5$ .................................................. F16K 15/12
[52] U.S. Cl. .................................. 137/543.15; 251/85; 251/337
[58] Field of Search ............. 137/533.31, 540, 543.15, 137/543.17, 543.21; 251/9, 85, 337

[56] References Cited

U.S. PATENT DOCUMENTS

| | | | |
|---|---|---|---|
| 767,118 | 8/1904 | Popham et al. | 137/543.15 |
| 828,036 | 8/1906 | Lindsay | 137/543.15 |
| 1,140,869 | 5/1915 | Birch | 137/543.15 |
| 1,385,932 | 7/1921 | Stayman | 137/543.15 |
| 1,839,403 | 1/1932 | MacFadden | 137/543.15 |
| 2,011,547 | 8/1935 | Campbell | 137/540 |
| 2,810,397 | 10/1957 | Olson et al. | 137/543.15 |
| 3,556,137 | 1/1971 | Billeter | 137/543.15 |
| 4,408,629 | 10/1983 | Lafont | 137/543.15 |
| 4,632,141 | 12/1986 | Post | 137/543.15 |

*Primary Examiner*—George L. Walton
*Attorney, Agent, or Firm*—Bernard J. Murphy

[57] ABSTRACT

To minimize metal-to-metal engagements of valve components, and relative movements therebetween, as an end toward reducing wear, the valving plate has an integral bushing, and both the plate and the bushing are formed of a non-metallic material. The bushing, therefore, moves with the valving plate; it has grooves formed therein in which to nest the plate-biasing spring.

9 Claims, 1 Drawing Sheet

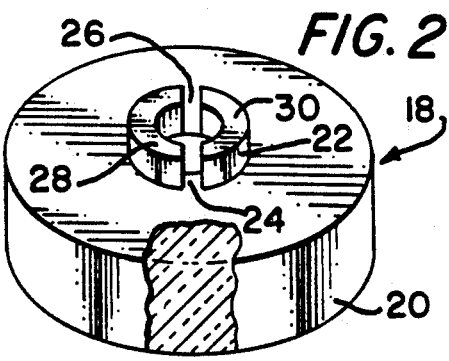
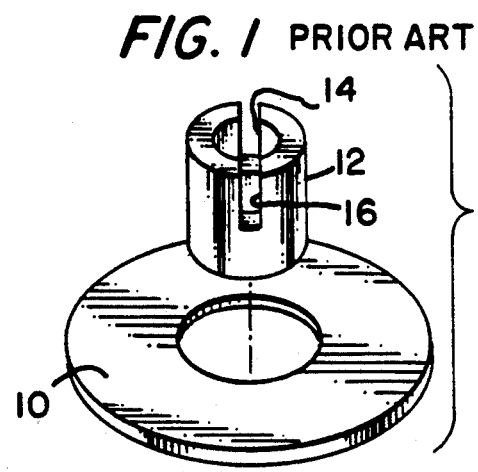
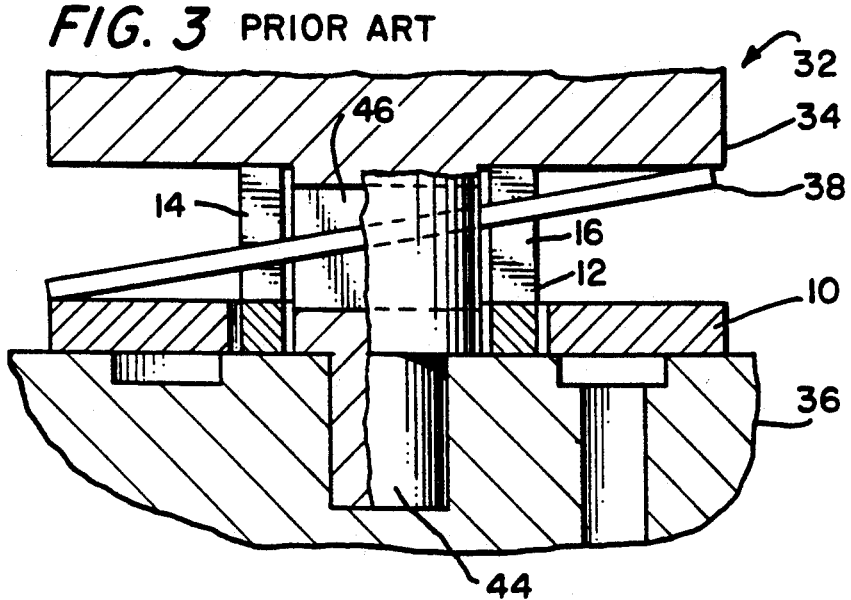
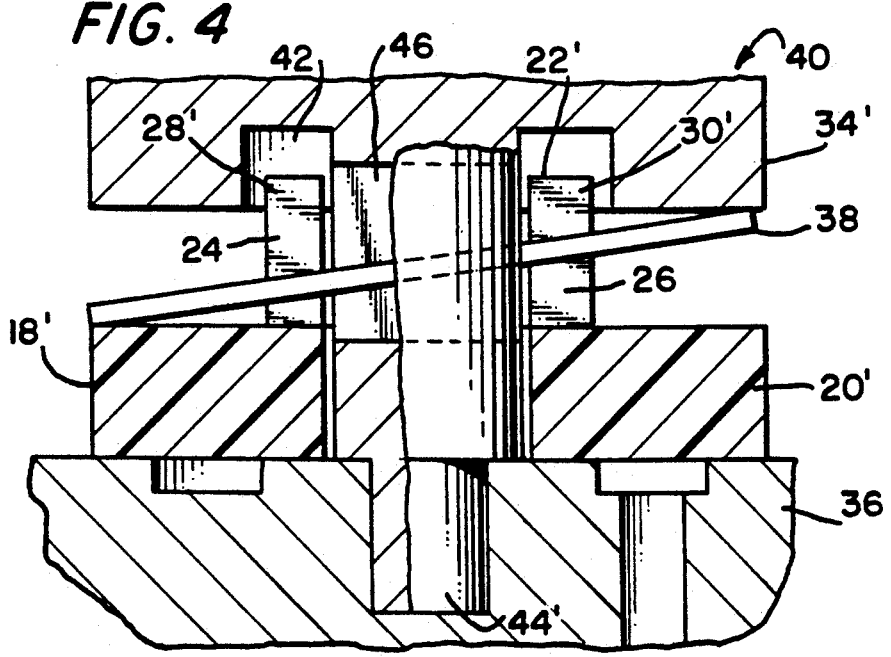

PLATE-TYPE VALVE FOR A PRESSURED-FLUID MACHINE, AND A VALVING PLATE ASSEMBLY THEREFOR

This invention pertains to plate-type valves for controlling fluid flow in pressured-fluid machines, such as gas compressors and the like, and to a valving plate assembly for such valves, and in particular to such a valve and valving plate assembly so configured as to (a) minimize wear, and to (b) improve the impact stress capability thereof.

Plate-type valves known in the prior art, especially those used for handling high fluid pressures in non-lubricated machines, employ a metallic valving plate and some form of polymer bushing, the latter to (a) guide the valving plate, and (b) to nestably guide the biasing spring. Use of a polymer bushing reduces metal to metal wear and increases the life of the valve. Such valves are of good design, but the same still experience undue wear arising from (a) a number of metal-to-metal contact areas, and (b) unwarranted relative motions, both vertical and rotational. Metal-to-metal contact still obtains between the spring and the guard, between the spring and the valving plate, and between the valving plate and the seat. The wear-producing, relative movements which occur are between the valving plate and the polymer bushing, which is both vertical and rotational, and can occasion improper seating of the valving plate, and between the valving plate and the spring, of a rotational nature, which causes wear between the valving plate and the spring, and forces the spring against the sides of the spring-guiding bushing grooves.

It is an object of this invention to set forth a plate-type valve in which such aforesaid metal-to-metal contact and wear-producing relative movements are significantly minimized, and to disclose, for use in such valves, an improved valving plate assembly which minimizes valve wear.

It is particularly an object of this invention to set forth a plate-type valve for a pressured-fluid machine such as a gas compressor, comprising a valve seat; a valve guard; a valving plate interposed between said guard and said seat for movement therebetween; a spring interposed between said plate and said guard for biasing said plate into engagement with said seat; and a bushing for guiding said spring; wherein said bushing is integral with said plate.

It is also an object of this invention to disclose, for a plate-type valve, for a pressured-fluid machine such as a gas compressor, having (a) a valve seat, (b) a valve guard, and (c) a spring for biasing a valving plate into engagement with said seat, a valving plate assembly, comprising a valving plate, for interpositioning between said seat and said guard; and a bushing for guiding said spring; wherein said bushing is integral with said valving plate.

Further objects of this invention will become apparent by reference to the following description, taken in conjunction with the accompanying figures, in which:

FIG. 1 is a perspective and exploded view of a prior art valving plate and bushing therefor;

FIG. 2 is a perspective illustration of the novel valving plate assembly, according to an embodiment thereof, with a portion thereof cut away;

FIG. 3 is a cross-sectional view of a prior art, plate-type valve which incorporates the valving plate and bushing of FIG. 1; and FIG. 4 is a cross-sectional view of the novel valve, according to an embodiment of the invention, the same incorporating the novel valving plate assembly of FIG. 2.

As shown in FIG. 1, prior art plate-type valves employ separate valving plates and polymer bushings, such as the plate 10 and bushing 12 depicted. The plate 10 is centrally apertured to accommodate therein the bushing 12, in order that, with vertical movement of the plate 10, the bushing 12 will guide the plate 10 in its travel. Too, the bushing has grooves 14 and 16 formed therein in which to nest a spring which is used to bias the plate 10 into engagement with a valve seat.

The novel valving plate assembly, according to a preferred embodiment thereof, denoted by the index number 18, comprises a valving plate 20 and an integral bushing 22. The assembly 18, in this embodiment, is formed of ceramic, as indicated by the cross-hatching of the cut away portion of the plate 20. The bushing 22 has a pair of grooves 24 and 26 formed therein, corresponding to the grooves 14 and 16 of the prior art bushing 12 of FIG. 1. For being integral with the plate 20, the bushing 22 comprises a pair of spaced apart, confronting, arcuate elements 28 and 30 upstanding from the plate 20, the elements being cooperative to define a spring-accommodating channel therebetween, via the spacing therebetween which form the grooves 24 and 26.

The prior art valve 32, shown in FIG. 3, incorporates the valving plate 10 and bushing 12 of FIG. 1 therein. The bushing 12 is held in place between the valve guard 34 and the valve seat 36, and receives the plate-biasing plate spring 38 within the grooves 14 and 16. It can be appreciated, upon study of FIG. 3, that the spring 38 and guard 34, plate 10 and spring 38, and plate 10 and seat 36 occasion metal-to-metal wear. Too, the valve plate 10 and the bushing 12 manifest both vertical and rotational movement therebetween, and rotational movement is experienced between the plate 10 and the spring 38.

The novel valve 40, depicted in a preferred embodiment of the invention, incorporates an alternative embodiment of the inventive valving plate assembly 18' which, in this configuration, is formed of poly ether ether ketone. Here, the guard 34' has an annular recess 42 formed therein into which, and from which, the bushing elements 28' and 30' can enter and withdraw, respectively. The spring 38 and seat 36 are a not different from those so-indexed in FIG. 3.

In both valves 32 and 40, of FIGS. 3 and 4, the guards 34 and 34', respectively, have a central post 44 and 44', which has a slot 46 formed therein through which the spring 38 protrudes.

Forming the novel valving plate assemblies 18 and 18' of non-metallic material, i.e., ceramic and poly ether ether ketone, respectively, offers a plate which is capable of withstanding the impact stresses from the valving plate 20 (and 20') as well as limiting any sliding friction wear. The metal-to-metal wear is reduced to just one pair of components: between the guard 34' and the spring 38. The critical wear, ordinarily occuring between the plate 20 (or 20') and the seat 36, is obviated. With the spring 38 now guided by the valving plate assembly 18 (or 18'), there is no longer any rotational movement therebetween. Too, since there is no relative rotational movement between the latter, the force of the spring 38 along the grooves 24 and 26 in the bushing 22 (or 22') is reduced, thus lowering the wear in that area as well. Further, as the bushing 22 (or 22') is now part of the valving plate 20 (or 22'), there is no longer any vertical or rotational movement therebetween. The only additional, relative motion arises from the fact that now the bushing 22 (or 22') moves vertically. This does not occasion any significant wear, since the forces related to this motion are spread over a much larger area as compared to the vertical motion of the prior art valving plate 10 relative to the bushing 12 thereof.

The invention offers fewer mutually wearing components, increased reliability of the novel valve 40 and valving plate assemblies 18 and 18' and, as a consequence thereof, increased operating life for the valve and assemblies.

While we have described our invention in connection with specific embodiments thereof, it is to be clearly understood that this is done only by way of example and not as a limitation to the scope of the invention as set forth in the objects thereof and in the appended claims.

We claim:

1. A plate-type valve for a pressured-fluid machine such as a gas compressor, comprising:
   a valve seat;
   a valve guard;
   a valving plate interposed between said guard and said seat for movement therebetween;
   a spring interposed between said plate and said guard for biasing said plate into engagement with said seat; and
   bushing means, integral with said plate, said bushing having a pair of grooves formed therein for (a) guiding said spring, (b) nesting said spring within said grooves and across said valving plate, (c) preventing relative rotation between said plate and said spring, and between said bushing means and said spring for preventing undue wear therebetween and said valve guard having means for engaging and guiding said valving plate and said bushing for properly aligning said valving plate relative to said valve seat.

2. A plate-type valve, according to claim 1, wherein:
   said bushing means comprises a bushing; and
   said plate and said bushing are formed of a non-metallic material.

3. A plate-type valve, according to claim 2, wherein:
   said guard has a recess formed therein confronting said plate; and
   said bushing is movable into and out of said recess.

4. A plate-type valve, according to claim 2, wherein:
   said bushing comprises a pair of spaced apart, confronting, arcuate elements upstanding from said plate.

5. A plate-type valve, according to claim 4, wherein:
   said elements cooperatively define a spring-accommodating channel therebetween; and
   said spring is set in said channel.

6. For a plate-type valve, for a pressured-fluid machine such as a gas compressor, having (a) a valve seat, (b) a valve guard, and (c) a spring for biasing a valving plate into engagement with said seat, a valving plate assembly therefor, comprising:
   a valving plate, for interpositioning between said seat and guard; and
   bushing means, integral with said plate, said bushing having a pair of grooves formed therein for (a) guiding said spring, (b) nesting said spring within said grooves and across said valving plate, (c) preventing relative rotation between said plate and said spring, and between said bushing means and said spring for preventing undue wear therebetween, and said valve guard having means for engaging and guiding said valving plate and said bushing for properly aligning said valving plate relative to said valve seat.

7. A valving plate assembly, according to claim 6, wherein:
   said bushing means comprises a bushing; and
   said plate and bushing are formed of a non-metallic material.

8. A valving plate assembly, according to claim 7, wherein:
   said bushing comprises a pair of spaced apart, confronting, arcuate elements upstanding from said plate.

9. A valving plate assembly, according to claim 8, wherein:
   said elements cooperatively define a spring-accommodating channel therebetween.

* * * * *